United States Patent [19]
Koch

[11] Patent Number: 5,320,333
[45] Date of Patent: Jun. 14, 1994

[54] SPRING FOR WINDSHIELD WIPER ARM

[76] Inventor: Jean Koch, 1635 Tillemont Street, Ville Brossard, Canada, J4W 2H9

[21] Appl. No.: 24,467

[22] Filed: Mar. 1, 1993

[51] Int. Cl.$^5$ .................................. F16F 1/06
[52] U.S. Cl. .......................... 267/155; 15/250.34; 15/250.35
[58] Field of Search ............ 267/155, 154, 275, 273, 267/279, 166; 151/250.2, 250.35, 250.34

[56] References Cited

U.S. PATENT DOCUMENTS

| 1,974,342 | 9/1934 | Morris | 267/155 X |
| 2,602,950 | 7/1952 | Sacchini | 15/250.2 |
| 2,660,748 | 12/1953 | Gaumer | 15/250.34 |
| 2,885,710 | 5/1959 | Brasty | 15/250.34 |
| 4,698,872 | 10/1987 | Watanabe | 15/250.2 |
| 4,718,139 | 1/1988 | Okuda et al. | 15/250.2 |
| 4,750,235 | 6/1988 | Scorsiroli | 15/250.2 |
| 4,993,102 | 2/1991 | Honda et al. | 15/250.2 |
| 5,008,971 | 4/1991 | Stewart, Sr. | 15/250.2 |
| 5,056,182 | 10/1991 | Fukumoto et al. | 15/250.2 |
| 5,062,175 | 11/1991 | Buchanan et al. | 15/250.2 X |

FOREIGN PATENT DOCUMENTS 0317856  5/1989  European Pat. Off. ......... 15/250.35

Primary Examiner—Robert J. Oberleitner
Assistant Examiner—Peter M. Poon
Attorney, Agent, or Firm—Pierre Lespérance; François Martineau

[57] ABSTRACT

The spring has an intermediate helical portion with a U-shaped open hook at each end. The helical portion is disposed in the region of the pivot of the wiper support arm to the base part which holds the support arm. One hook wraps around the wiper support arm, passing over and hooking underneath the same and the other hook wraps around the base part, passing underneath and hooking on the top of said base part. The spring greatly increases the wiper pressure on the windshield. The spring remains properly hooked even when the support arm is pivoted away from the windshield.

4 Claims, 1 Drawing Sheet

SPRING FOR WINDSHIELD WIPER ARM

FIELD OF THE INVENTION

This invention relates to vehicle windshield wipers, and particularly to the wiper mounting bracket.

BACKGROUND OF THE INVENTION

The windshield wiper on vehicles already have some means of maintaining a certain pressure of the wiper blade against the windshield. Generally the wiper arm does not sit very high off the windshield and the helical tension spring that is stretched between a fixed base to a drive shaft and a pivoting wiper arm does not have sufficient space to exert a long moment arm thus creating very weak pressure on the wiper blade compared to the force exerted by the spring since it is working in tension with a short moment arm. Nevertheless, the spring must be extremely strong in comparison to the arm and pivot strength to create a sufficiently strong torque to generate a good pressure on the wiper blade so that in turn the blade gives a satisfactory wiping action against the windshield.

Moreover, as generally encountered at high vehicle speed or when vehicle is facing strong winds, wind lift on the arm and blade counteracts the force exerted by the spring to reduce the wiping action of the blade in an unsatisfactory manner.

No simple means are currently known for increasing the wiping pressure of the wiper blade on the windshield.

The following prior art patent documents have been uncovered by the present inventor: Canadian patent No. 811,909 issued in 1969; and the following U.S. Pat. Nos.: 5,062,175 issued in 1991; 4,698,872 issued in 1987; 4,718,139 issued in 1988; 4,993,102 issued in 1991; 5,008,971 issued in 1991; and 5,056,182 issued in 1991.

OBJECTS AND SUMMARY OF THE INVENTION

The spring is formed of a resilient rod bent to define an intermediate helical torsion portion with a hook at each end shaped to be wrapped around the fixed base and the pivoting wiper arm in such a way that an additional force is applied to the wiper blade by the cranking effect of the torsional helical portion. In this fashion, the blade receives sufficient pressure to provide a satisfactory wiping action and to resist wind lift. The spring remains properly hooked even if the support arm is pivoted away from the windshield. The spring can be installed as an addition to the majority of present vehicles, without the need of special tools.

DETAILED DESCRIPTION OF THE INVENTION

Figure 1:
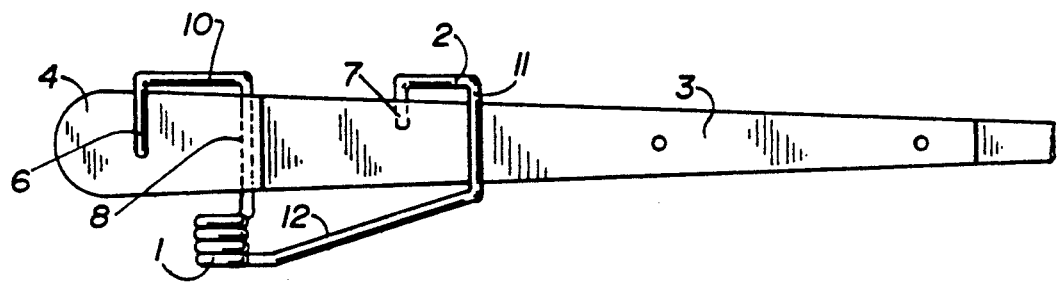
FIG. 1 is a top view of a wiper arm attached to the fixed base and with the spring of the invention wrapped around the same.

The spring of the invention consists of a resilient rod made of a sturdy, waterproof material such as plastic or metal. The rod is bent to include a coiled intermediate section 1, preferably making four to five convolutions. One end portion of the rod defines a first U-shape hook section formed by parallel bottom arm 8 and top arm 6 which are joined by a bight 10. The other end portion of the rod defines a second U-shape hook section formed by parallel bottom arm 7 and top arm 11 which are joined by a bight 2. The two hook sections open towards the coiled section 1 and all the arms 8, 6, and 7 and 11 are parallel to each other and generally parallel to the axis of the coiled section 1. The bottom arm 8 of the first hook section extends directly from the inner convolution of the coiled section 1. A connector arm 12 joins the other convolution of the coiled section 1 with the top arm 11 of the second hook section. The two bights 2 and 11 are generally coplanar. The connector arm 12 is generally tangent to the outer convolution of the coiled section 1 and is inclined towards the plane containing bights 2 and 10 starting from the outer convolution of coiled section 1. The spring is adapted to be positioned on a conventional wiper support arm 3 which is pivoted at 9 to a base part 4 which is mounted on a conventional driving shaft 5 to produce wiping movement of a wiper (not shown) on a windshield (not shown), the wiper being carried by the outer end of the wiper support arm 3.

In the mounted position the coiled section 1 is disposed on one side of the base part 4 and support arm 3 in the region of the pivotal axis 9 and with the axis of the coiled section generally parallel to said pivot axis 9.

The two bights 10 and 2 extend over the sides of the base part 4 and support arm 3 which are opposite to coiled section 1 while the bottom arm 8 and top arm 6 extend transversely of the base part 4 being applied against the underside and the top face of base part 4, respectively.

Similarly, the second hook section has its arms 11 and 7 extending transversely of the support arm 3 with the top arm 11 and bottom arm 7 being applied against top face and the underside respectively of the support arm 3.

Figure 2:
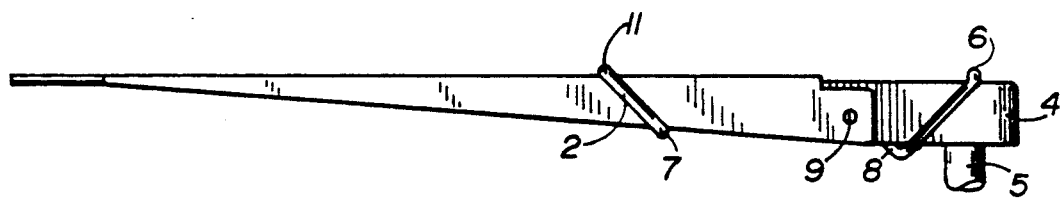
FIG. 2 is a side view of the assembly of FIG. 1.
Figure 3:
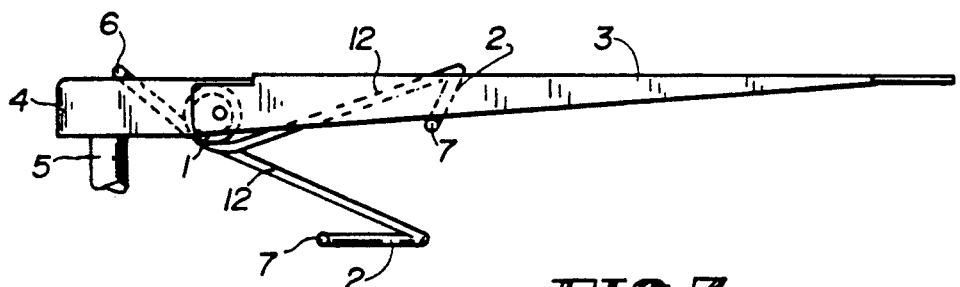
FIG. 3 is an opposite side view of the assembly of FIG. 1, showing in dotted lines the spring in stressed operative position, and in full lines the unstressed position of the spring before being hooked to wiper support arm.
Figure 4:
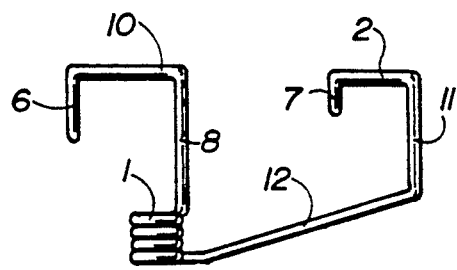
FIG. 4 shows a top view of the helical torsion spring.

As shown in FIGS. 2 and 3, in the stressed operative position of the spring, the two top arms 6 and 11 are farther away from each other and also from the pivot axis 9 than the bottom arms 8 and 7.

Since arm 7 of the second hook position extends under the support arm 3, the spring remains positively hooked to said support arm 3 even when the same is pivoted about axis 9 away from the windshield for instance for washing the latter.

The provision of the coiled section 1 including several convolutions enables the support arm to pivot at least through 90 degrees with respect to the base part 4 without the spring reaching its elastic limit and breaking. Also, the several convolutions of the coiled section 1 permit to form a spring which applies a great pleasure on the support arm.

I claim:

1. A spring for engaging both a windshield wiper support arm and a base part to which said wiper support arm is hinged about a pivot axis for pivotal movement away and towards the windshield to be engaged by a wiper carried by said wiper support arm, each of said base part and support arm having a top surface, a bottom surface and a first and a second side, said spring consisting of a resilient rod bent to include an intermediate coiled section consisting of at least two co-axial convolutions defining an inner and outer convolution, a first and a second U-shaped hook section each including a top and a bottom arm connected by a bight portion, and each hook section opening toward said coiled section with its top and bottom arms generally parallel to the axis of the coiled section, the bottom arm of said first hook section directly extending from said inner convolution, a connector arm connecting said second hook section to said coiled section, merging with and generally tangent to said outer convolution and merging with said top arm of said second hook section, said spring adapted to be positioned on said base part and support arm with the axis of said coiled section generally parallel to and in the region of said pivot axis and with said inner convolution positioned adjacent to said first side of said base part and with the bright portions of said first and said second hook sections extending across said second sides of said base part and of said support arm respectively and with the top and bottom arms of said first and second hook sections extending transversely of said base part and of said support arm on the top and bottom surfaces thereof respectively.

2. A spring as defined in claim 1, wherein the distance between the top and bottom arms of each U-shaped hook section is greater than the distance between the top and bottom surfaces of said base part and support arm and wherein both bight portions make an acute angle between themselves in the unstressed condition of said spring, whereby when said spring is stressed and positioned on said base part and on said support arm, the top arms of said first and second hook sections are farther from said pivot axis and from each other, than the bottom arms of said first and second hook sections, longitudinally of said base part and of said support arm.

3. A spring as defined in claim 2, wherein said coiled section includes at least four co-axial convolutions.

4. A spring as defined in claim 3, wherein both bight portions are generally co-planar in a plane normal to the axis of said coiled section and wherein said connector arm is inclined towards said bight portions starting from said outer convolution.

* * * * *

UNITED STATES PATENT AND TRADEMARK OFFICE
CERTIFICATE OF CORRECTION

PATENT NO. : 5,320,333

DATED : June 14, 1994

INVENTOR(S) : Koch, Jean

It is certified that error appears in the above-identified patent and that said Letters Patent is hereby corrected as shown below:

Column 2, line 61 delete "pleasure" and insert --pressure--

Signed and Sealed this

Seventeenth Day of February, 1998

Attest:

BRUCE LEHMAN

Attesting Officer

Commissioner of Patents and Trademarks